US012586516B2

(12) United States Patent
Lee et al.

(10) Patent No.: US 12,586,516 B2
(45) Date of Patent: Mar. 24, 2026

(54) DISPLAY DEVICE

(71) Applicant: LG ELECTRONICS INC., Seoul (KR)

(72) Inventors: Insu Lee, Seoul (KR); Yanghyun Kim, Seoul (KR); Daeseong Seo, Seoul (KR); Cheolwan Choi, Seoul (KR); Jonggon Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 18/682,756

(22) PCT Filed: Aug. 19, 2021

(86) PCT No.: PCT/KR2021/011035
§ 371 (c)(1),
(2) Date: Feb. 9, 2024

(87) PCT Pub. No.: WO2023/022260
PCT Pub. Date: Feb. 23, 2023

(65) Prior Publication Data

US 2024/0346988 A1 Oct. 17, 2024

(51) Int. Cl.
*G09G 3/32* (2016.01)

(52) U.S. Cl.
CPC ......... *G09G 3/32* (2013.01); *G09G 2300/026* (2013.01); *G09G 2320/0626* (2013.01); *G09G 2354/00* (2013.01); *G09G 2360/145* (2013.01); *G09G 2370/00* (2013.01); *G09G 2380/06* (2013.01)

(58) Field of Classification Search
CPC ............... G09G 3/32; G09G 2300/026; G09G 2320/0626; G09G 2354/00; G09G 2360/145; G09G 2370/00; G09G 2380/06; G09G 3/20; G06F 3/14; G06F 3/014; G09F 9/33
See application file for complete search history.

(56) References Cited

U.S. PATENT DOCUMENTS

2006/0018117 A1* 1/2006 Lai .......................... H04M 1/22 362/253
2008/0186260 A1* 8/2008 Lee ...................... G09G 3/3225 345/77
2016/0358582 A1* 12/2016 Lee ....................... G06F 3/1446
2020/0372877 A1 11/2020 Weindorf

FOREIGN PATENT DOCUMENTS

KR 10-0805684 B1 2/2008
KR 10-2012-0137039 A 12/2012
KR 10-2017-0135394 A 12/2017
KR 10-2098208 B1 4/2020
KR 10-2255387 B1 5/2021

* cited by examiner

*Primary Examiner* — Jonathan A Boyd
(74) *Attorney, Agent, or Firm* — Birch, Stewart, Kolasch & Birch, LLP

(57) ABSTRACT

A display device according to embodiments comprises: a display which includes a plurality of display modules; a sensor which measures light intensity to which the display is exposed; one or more driving units which drive the display; two or more current output units which are connected to each of the one or more driving units and output different currents; and a processor which controls the driving units to be connected to at least one of the two or more current output units, on the basis of the light intensity measured by the sensor.

17 Claims, 9 Drawing Sheets

DISPLAY DEVICE

CROSS REFERENCE TO RELATED APPLICATIONS

This application is the National Phase of PCT/KR2021/011035 filed on Aug. 19, 2021, which is hereby expressly incorporated by reference into the present application.

TECHNICAL FIELD

The present disclosure relates to a display device, and more particularly to a display device capable of controlling luminance (or brightness).

BACKGROUND ART

A digital signage is a display installed inside and outside a building using a digital information display (DID), and is a device that provides images or videos containing advertisements and various information. Types of digital signage may include outdoor digital signage and indoor digital signage.

Outdoor digital signage refers to digital signage installed on an electronic signboard and/or an exterior wall of a building, or installed outside for an outdoor cinema. Indoor digital signage refers to digital signage installed on an inner wall of a large shopping mall or in the form of a signboard.

At this time, the outdoor digital signage has disadvantages in that the external environment for the display cannot be controlled due to characteristics of outdoor digital signage being installed outdoors. For example, the outdoor digital signage may have difficulty in setting the quality of images because it is difficult to control luminance (or brightness) of obstacles such as clouds and wind due to differences in illuminance between day and night.

DISCLOSURE

Technical Problem

In order to address the above-mentioned problems, an object of the present disclosure is to provide a display device using one type of driver.

Another object of the present disclosure is to provide a display device using one type of light emitting device package.

Another object of the present disclosure is to provide a display device capable of coping with a change in the external environment.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with an aspect of the present disclosure, a display device may include a display configured to include a plurality of display modules: a sensor configured to measure the amount of light for the display: one or more drivers configured to drive the display: two or more current output units respectively connected to the one or more drivers, and configured to output different currents; and a processor configured to control the driver to be connected to at least one of the two or more current output units based on the amount of light measured by the sensor.

According to the embodiments, the two or more current output units may include a first resistor and a second resistor having a resistance value greater than the first resistance. The processor may control the driver to be connected to the first resistor when the amount of light measured by the sensor is equal to or greater than a preset value, and may control the driver to be connected to the second resistor when the amount of light measured by the sensor is less than a preset value.

According to the embodiments, the two or more current output units may include two or more voltages having different sizes, wherein the processor may control the driver to be connected to at least one of the two or more voltages based on the amount of light measured by the sensor.

According to the embodiments, the two or more voltages may include a first voltage and a second voltage having a magnitude smaller than the first voltage. The processor may control the driver to be connected to the first voltage when the amount of light measured by the sensor is equal to or greater than a preset value, and may control the driver to be connected to the second voltage when the amount of light measured by the sensor is less than a preset value.

According to the embodiments, the display may include a first group configured to include at least a portion of the plurality of display modules, and a second group configured to include at least another portion of the plurality of display modules. The processor may control the driver connected to each of the first group and the second group to be connected to different current output units from among the two or more current output units, when the amount of light for the first group is different from the amount of light for the second group.

According to the embodiments, the plurality of display modules may include a first display module and a second display module. The processor may control the driver connected to each of the first display module and the second display module to be connected to different current output units from among the two or more current output units, when the amount of light for the first display module is different from the amount of light for the second display module.

According to the embodiments, the display module may include a plurality of light emitting device packages configured to include a first light emitting device package and a second light emitting device package. The processor may control the driver connected to each of the first light emitting device package and the second light emitting device package to be connected to different current output units from among the two or more current output units, when the amount of light for the first light emitting device package is different from the amount of light for the second light emitting device package.

According to the embodiments, the processor may control the driver to be connected to at least one of the two or more current output units based on an average value of the amount of light measured by the sensor for a preset time.

According to the embodiments, the display device may further include a memory configured to store data. The processor may calculate an hourly position and angle of the sun with respect to the display based on data previously stored in the memory, and may control the driver to be connected to at least one of the two or more current output units based on the calculated position and angle of the sun.

According to the embodiments, one or more user interfaces (UIs) configured to control the driver to be connected to at least one of the two or more current output units may be displayed on the display. When an input to the user interface (UI) is detected, the processor may control the driver to be connected to at least one of the two or more current output units based on the detected input.

According to the embodiments, the display device may further include a communication unit configured to transmit and receive data to and from the outside, wherein the processor may control the driver to be connected to at least one of the two or more current output units based on data input through the communication unit.

According to the embodiments, the two or more current output units may include a first current output unit and a second current output unit having an output current different from that of the first current output unit. The processor may control the drive unit to be alternately connected to the first current output unit and the second current output unit at intervals of a preset time.

Advantageous Effects

Embodiments of the present disclosure can control luminance (or brightness) of a display.

Embodiments of the present disclosure can control luminance without loss in gamma and grayscale expression.

Embodiments of the present disclosure can reduce power consumption.

Further scope of applicability of the embodiments will become apparent from the following detailed description. However, since various changes and modifications can be clearly understood by those skilled in the art within the spirit and scope of the embodiments, it is to be understood that specific embodiments, such as the detailed description and the preferred embodiments of the present disclosure, are given by way of illustration only.

BEST MODE

Figure 1:
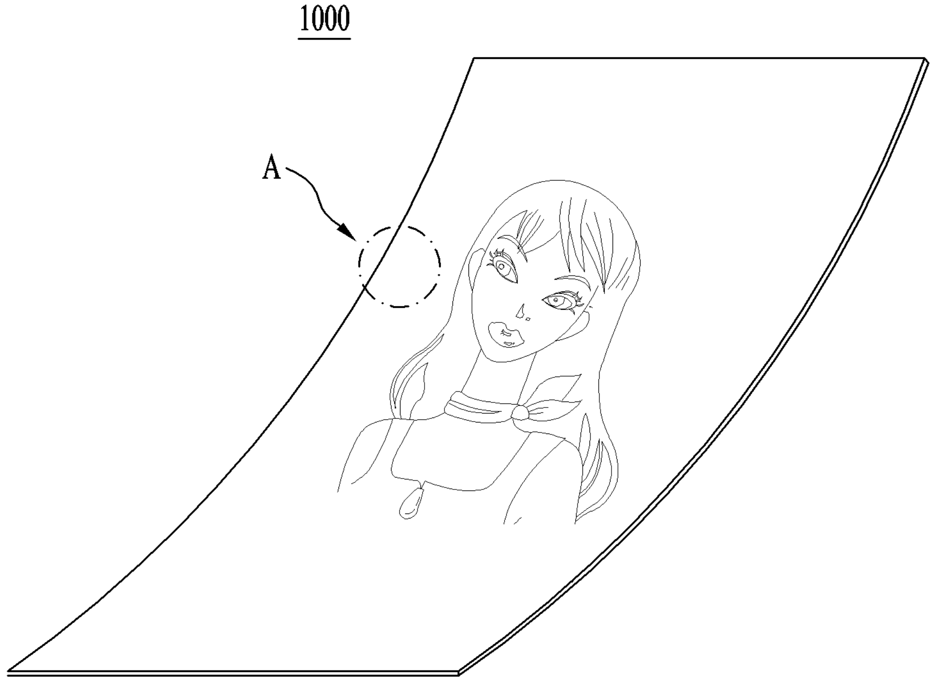
FIG. 1 is a conceptual diagram illustrating a display device using light emitting devices according to the embodiments of the present disclosure.

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

When an element, such as a layer, a region, or a substrate, is referred to as being "on" another component, it may be directly on another element or an intervening element may be present therebetween.

Although the terms first, second, etc. are used to describe various elements of the embodiments, these elements should not be limited by these terms. These terms are only used to distinguish one element from another. For example, a first user input signal may be referred to as a second user input signal. Similarly, the second user input signal may be referred to as a first user input signal. Use of such terms should be interpreted as not departing from the scope of the various embodiments. The first user input signal and the second user input signal are both user input signals, but do not mean the same user input signals unless clearly indicated in context.

The terminology used in the description of the embodiments herein is for the purpose of describing particular embodiments only and is not intended to be limiting. As used in the description of the various described embodiments and the appended claims, singular forms are intended to include plural forms as well, unless the context clearly indicates otherwise. The term "and/or" as used herein refers to and encompasses any and all possible combinations of one or more of the associated listed items. The term "includes" specifies the presence of stated features, numbers, steps, elements, and/or components, but does not preclude the presence or addition of one or more other features, numbers, steps, elements, and/or components thereof. A conditional expression such as "when ~" or "if ~" used in the description of the embodiments is not limitedly interpreted only as an optional case. Rather, the conditional expression has been intended such that a related operation may be performed or related definition may be interpreted when a specific condition is satisfied or in response to a specific condition.

Furthermore, although each drawing is described for convenience of description, it is also within the scope of the present disclosure that those skilled in the art implement other embodiments by combining at least two or more drawings.

When an element, such as a layer, a region, or a substrate, is referred to as being "on" another component, it may be directly on another element or an intervening element may be present therebetween.

A display device described through the embodiments is a concept including all display devices that display information as unit pixels or as a set of unit pixels. Therefore, the display device according to the present disclosure can be applied not only to finished products but also to components. For example, a panel corresponding to one component of a digital TV independently corresponds to a display device of the present specification.

However, those skilled in the art will readily recognize that the configurations applicable to the embodiments of the present disclosure can be applied to a displayable device, even in the form of a new product to be developed in the future.

The semiconductor light emitting device or the light emitting device mentioned through the embodiments is a device that converts electricity into light. For example, the semiconductor light emitting device and the light emitting device may include LEDs, micro-LEDs, etc., and may be used interchangeably. In addition, the semiconductor light emitting device or the light emitting device is a device that emits light, and may function, for example, as a backlight. In addition, a method for providing a semiconductor light-emitting device or a light-emitting device on a substrate (e.g., a printed circuit board (PCB) substrate) is not limited to the configuration described through the embodiments. For example, the semiconductor light emitting device or the light emitting device may be provided on a substrate by various methods including, for example, a wire bonding type, a flip chip type, a TSV (through silicon via) type, etc.

Illuminance explained through the embodiments may refer to the amount of light given per unit area. In this specification, light quantity and illuminance may be used interchangeably.

FIG. 1 is a conceptual diagram illustrating a display device 1000 using light emitting devices according to the embodiments of the present disclosure.

As shown in FIG. 1, information processed by the processor 1500 (see FIG. 3) of the display device 1000 may be displayed using a flexible display. In FIG. 1, a flexible display is shown as an example of the display device 1000, but the display device 1000 is not limited thereto. For example, the display device may include a mobile phone, a smartphone, a laptop, a digital broadcasting terminal, a personal digital assistant (PDA), a portable multimedia player (PMP), a navigation system, a slate PC, a tablet, an ultrabook, a digital TV, a desktop computer, an outdoor LED, digital signage, an outdoor billboard, etc.

A flexible display may include, for example, a display that can be bent, twisted, folded, or rolled by external force.

Furthermore, a flexible display may be, for example, a display fabricated on a thin flexible substrate that can be bent, folded, or rolled like paper, while maintaining display characteristics of a conventional flat panel display.

In a state in which the flexible display is not bent (for example, a state with an infinite radius of curvature, hereinafter referred to as a first state), a display region of the flexible display becomes flat. In the first state, when the display region is bent by external force (for example, a state with a finite radius of curvature, hereinafter referred to as a second state), the display region may become a curved surface.

As shown in FIG. 1, information displayed in a second state may be visual information output on a curved surface. This visual information may be implemented by independently controlling light emission of unit pixels (sub-pixels) arranged in a matrix structure. A unit pixel means, for example, a minimum unit for implementing one color.

Figure 7:
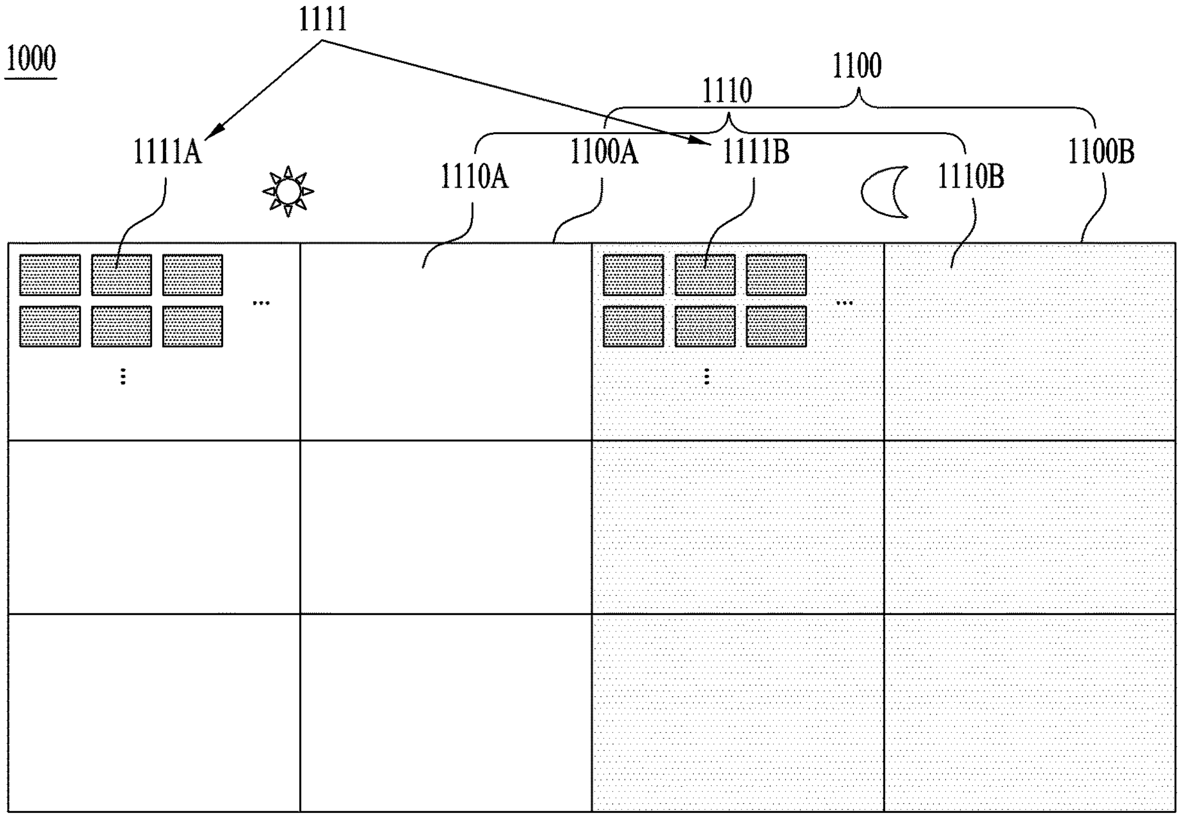
FIG. 7 is a diagram schematically illustrating a front view of a display device according to the embodiments of the present disclosure.

A unit pixel of a flexible display may be implemented by a semiconductor light emitting device 1111 (see FIG. 7).

The semiconductor light emitting device or the light emitting device mentioned through the embodiments is a device for converting electricity into light, and including, for example, LEDs, micro-LEDs, etc. The semiconductor light emitting device and the light emitting device may be used interchangeably. In addition, the semiconductor light emitting device or the light emitting device is a device that emits light, and may function, for example, as a backlight.

In addition, a method for providing the semiconductor light emitting device or the light-emitting device on a substrate (e.g., a printed circuit board (PCB) substrate) is not limited to the configuration described through the embodiments, and may be provided on a substrate by various methods including, for example, wire bonding, a flip-chip bonding, and a TSV (Through Silicon Via).

The light emitting device may be formed to have a small size, so that the light emitting device may function as a unit pixel even in the second state.

In FIG. 1, a flexible display is shown as an example of the display device 1000, but the display device 1000 is not limited thereto. The display device 1000 may include, for example, a mobile phone, a smartphone, a laptop, a digital broadcasting terminal, a personal digital assistant (PDA), a portable multimedia player (PMP), a navigation device, a slate PC, a tablet, an ultrabook, a digital TV, a desktop computer, an outdoor LED, digital signage, an outdoor billboard, etc.

Hereinafter, the portion 'A' of FIG. 1 will be enlarged and the display device 1000 according to the embodiments of the present disclosure will be described in detail.

Figure 2:
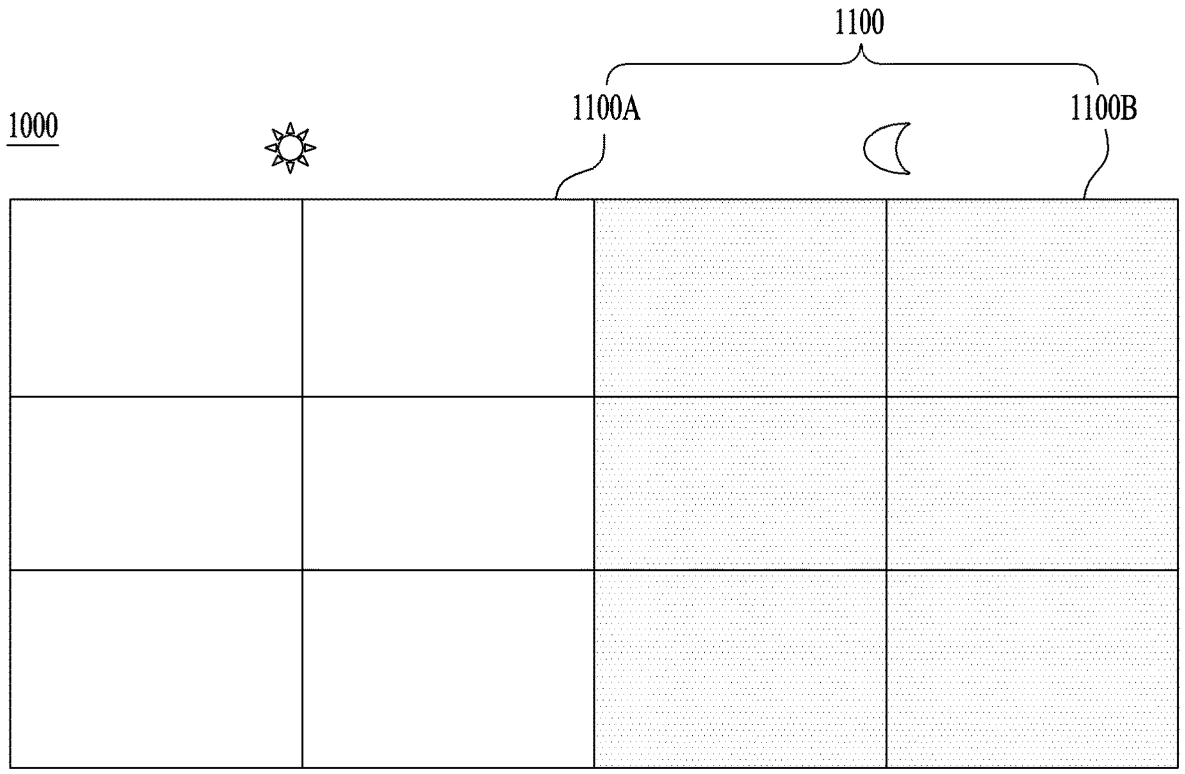
FIG. 2 is a diagram schematically illustrating a front view of a display device according to the embodiments of the present disclosure.

FIG. 2 is a diagram schematically illustrating a front view of the display device 1000 according to the embodiments of the present disclosure.

The display device 1000 according to the embodiments of the present disclosure may include a display 1100 including a plurality of display modules (e.g., 1110A, 1110B).

A display module (e.g., 1110A, 1110B) according to the embodiments of the present disclosure may include a plurality of light emitting device packages (e.g., 1111A, see FIG. 7). The display module (e.g., 1110A, 1110B) may include a plurality of light emitting device packages (e.g., 1111A, see FIG. 7) mounted on a substrate (not shown).

A light emitting device package (e.g., 1111A, see FIG. 7) according to the embodiments of the present disclosure may include light emitting devices (not shown), and may electrically connect the substrate and the driver to the light emitting devices. The light emitting device package (e.g., 1111A, see FIG. 7) may allow the light emitting devices to be electrically connected to the substrate to emit light. The light emitting device package (e.g., 1111A, see FIG. 7) may electrically connect the light emitting devices to the driver 1300 (see FIG. 3), so that the light emitting devices can be turned on or off. However, the light emitting device package (e.g., 1111A, see FIG. 7) may include the driver and/or the substrate.

The substrate according to the embodiments may be a substrate on which circuits, wiring, electrical circuits, electrode pads, or electrode patterns are printed to correspond to light emitting devices, and may include a printed circuit for applying electrical signals to the light emitting devices. For example, the substrate may be a printed circuit board (PCB). Although not shown in FIG. 2, a separate printed circuit board (PCB) may also be disposed below the substrate. However, the light emitting device may be included in the light emitting device package (e.g., 1111A, see FIG. 7) without the substrate, and may be driven.

The driver according to the embodiments of the present disclosure may control driving of the light emitting devices. The driver 1300 may control the on/off operation of the light emitting devices. For example, the driver may include a driver integrated circuit (IC).

The driver may be provided on one side of the substrate on which the light emitting devices are not disposed to control the light emitting devices. That is, the driver 1300 may be provided on a rear surface of the substrate on which the light emitting devices are not disposed, rather than on a top surface of the substrate on which the light emitting devices are disposed. However, the position of the driver is not limited thereto, and the driver may also be provided at any position that can be electrically connected to the light emitting elements. For example, the driver may be provided on one side of the substrate on which the light emitting devices are disposed and arranged in parallel to the light emitting devices.

Meanwhile, when the display device 1100 is installed outside or inside, the display device 1100 may be affected by the external environment that is controllable or uncontrollable externally or internally. For example, when the display device 1000 is installed outside, in the daytime setting, illuminance of the display 1100 changes as the position of the sun changes.

The display device 1000 may include a display 1100 of a preset size or more. In FIG. 2, reference symbol '1100A' may represent at least a portion of the display 1100 upon which high illuminance (including external environment related to brightness such as the amount of light and luminance) is incident, and reference symbol '1100B' may represent at least another portion of the display 1100 upon which low illuminance is incident. However, this is merely an example, and the display 1100 may be subdivided into various sizes depending on the external environment (e.g., illuminance).

As the display 1100 is formed to have a preset size or more, at least a portion of the display 1100 (e.g., 1100A) may be exposed to high illuminance, and at least another portion 1100B of the display 1100 may be exposed to low illuminance. That is, different illumination levels may be incident upon the first display, which is at least a portion of the display device 1000, and the second display, which is at least another portion of the display device 1000. In this case, the display 1100 may cause loss in gamma and grayscale expression depending on the surrounding illumination.

Alternatively, as the display 1100 is operated during the day or at night, the display 1100 may enable a luminance value for daytime setting and a luminance value for nighttime setting to be different from each other. That is, when the display 1100 is operated at night with the daytime setting, or when the display 1100 is operated during the day with the nighttime setting, a loss in gamma or grayscale expression may occur.

As described above, in order to prevent loss of gamma or grayscale expression, the display 1100 may include two or more types of light emitting device packages or two or more types of drivers. That is, the display 1100 may include a light emitting device package and/or a driver that are driven when there is high illuminance, and a light emitting device package and/or a driver that is driven when there is low illuminance.

However, in this case, there is a problem that a thickness of the substrate for installing the driver or the light emitting device package thereon becomes too thick and the circuit for such installation becomes complicated. Additionally, in this case, there is a problem of high costs.

Accordingly, a display device 1000 that can set luminance without loss of gamma or grayscale expression according to illuminance of the display 1100 will be described in detail. To this end, each configuration of the display device 1000 will first be described in detail.

Figure 3:
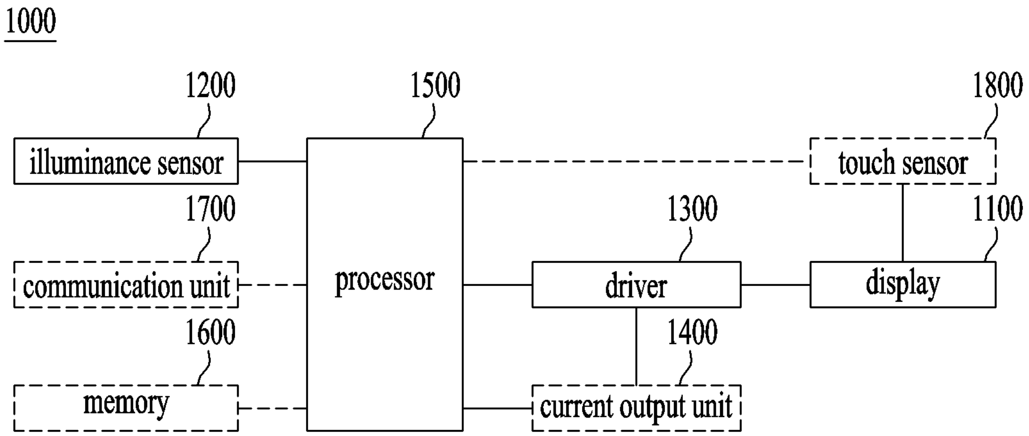
FIG. 3 is a block diagram illustrating a structure of a display device according to the embodiments of the present disclosure.

FIG. 3 is a block diagram illustrating a structure of the display device 1000 according to the embodiments of the present disclosure.

Referring to FIG. 3, 1000 denotes a display device, 1100 denotes a display, 1200 denotes an illumination sensor, 1300 denotes a driver, 1400 denotes a current output unit, 1500 denotes a processor, 1600 denotes a memory, 1700 denotes a communication unit, and 1800 denotes a touch sensor. The display device 1000 according to the embodiments of the present disclosure may include all of the components shown in FIG. 3 or may include only a portion of the components shown in FIG. 3. Additionally, the display device 1000 may further include configurations other than those shown in FIG. 3.

The display device 1000 according to the embodiments of the present disclosure may include a display 1100 including a plurality of display modules 1110 (see FIG. 2), a sensor (e.g., 1200) for measuring the amount of light for the display 1100, one or more drivers 1300 for driving the display 1100, a current output unit 1400 connected to the one or more drivers 1300, and a processor 1500 for controlling all or part of the components included in the display device 1000.

The display 1100 according to the embodiments may output videos or images. For example, the display 1100 may be set to 6000 nits as high luminance during the daytime setting. Additionally, for example, the display 1100 may be set to 48 nits as low luminance during the nighttime setting.

The display 1100 may further include a touch sensor 1800. The touch sensor 1800 may include a touch input means provided on the exterior of the display 1100. For example, the touch sensor 1800 may include a virtual key, a soft key, or a visual key displayed on the outside of the display device 1000 through software processing.

The touch sensor 1800 may detect a user input through a touch input received or sensed through the exterior of the display 1100. The touch sensor 1800 may be implemented outside the display device 1000 by forming an interlayered structure or an integrated structure with the display 1100.

A sensor (e.g., 1200) according to the embodiments may include an illuminance sensor 1200. The illuminance sensor 1200 may measure illuminance of the display 1100. Alternatively, the illuminance sensor 1200 may measure illuminance for each of the plurality of display modules 1110 (see FIG. 2) included in the display 1100. Alternatively, the illuminance sensor 1200 may measure illuminance of at least a portion of each display module 1110 (see FIG. 2), for example, illuminance of the light emitting device package 1111A (see FIG. 7).

The illuminance sensor 1200 may transmit information about the measured illuminance to the processor 1500. Information about illuminance measured by the illuminance sensor 1200 may include information about the amount of light incident upon each of the display 1100, the display module 1110 (see FIG. 2), and the light emitting device package 1111A (see FIG. 7), information about an angle of incident light, and information about the position of a light source of the incident light.

The illuminance sensor 1200 may form an interlayered structure with the display 1100 or may form an integrated structure with the display 1100. Alternatively, the illuminance sensor 1200 may be installed inside or outside the display device 1000, regardless of the display 1100.

The driver 1300 according to the embodiments may drive the display 1100, as described with reference to FIG. 2. The driver 1300 may drive the entire display 1100 by only one driver 1300, and the plurality of drivers 1300 may drive at least a portion (e.g., one or more display modules, or one or more light emitting device packages) of the display 1100.

The driver 1300 may drive at least a portion of the display 1100 based on information about illuminance measured by the illuminance sensor 1200 by the processor 1500. The driver 1300 may be controlled by the processor 1500 to be connected to at least one of two or more current output units 1400 based on information about the illuminance measured by the illuminance sensor 1200. At this time, when a plurality of drivers 1300 is used, the drivers 1300 may be connected to two or more different current output units, respectively:

The current output unit 1400 according to the embodiments may refer to a unit configured to output a current.

The current output unit 1400 may include one type of current output unit, and may output two or more different currents. For example, the current output unit may include one type of resistor, and may include a first resistor and a second resistor that output two or more different currents. The current output unit 1400 may include two or more types of current output units. Alternatively, for example, the current output unit 1400 may include two types of resistors, and may output two or more different currents. For example, the current output unit may include a first resistor and a first voltage.

The driver 1300 may be connected to an appropriate current output unit 1400 based on a value measured by the illuminance sensor 1200, and may output an appropriate current.

The processor 1500 according to the embodiments may control all or at least some components of the display device 1000 to provide or process appropriate information or functions to the user.

The memory 1600 according to the embodiments may store a plurality of application programs (application programs or applications) driven in the display device 1000, and data and instructions for operating the display device 1000. At least some of these applications may be downloaded from an external server via wireless communication. Additionally, at least some of these application programs may be present in the display device 1000 from the time of shipment for basic functions (e.g., image output) of the display device 1000.

Meanwhile, the application program may be stored in the memory 1600, may be installed on the display device 1000, and may be driven by the processor 1500 to perform the operation or function of the display device 1000.

The communication unit 1700 according to the embodiments can transmit and receive data to or from an external device in a wireless or wired manner. For example, the communication unit 1700 may include one or more modules for enabling wireless communication between the display device 1000 and another display device, between the display device 1000 and a sound output device (not shown, including both one case in which the sound output device is provided inside the display device and another case in which the sound output device is provided outside the display device), and between the display device 1000 and an external server. Additionally, the communication unit 1700 may include one or more modules that connect the display device 1000 to one or more networks.

However, the scope of the objects to which the communication unit 1700 can be connected wirelessly or by wire are not limited thereto, and even new products to be developed in the future may communicate with the display device 1000 if wireless or wired communication is possible.

The communication unit 1700 may include, for example, at least one of a broadcast reception module, a mobile communication module, a wireless Internet module, a short-range communication module, and a location information module (e.g., GPS module).

Hereinafter, a method for driving the display device 1000 will be described in detail with reference to all or a part of these configurations.

Figure 4:
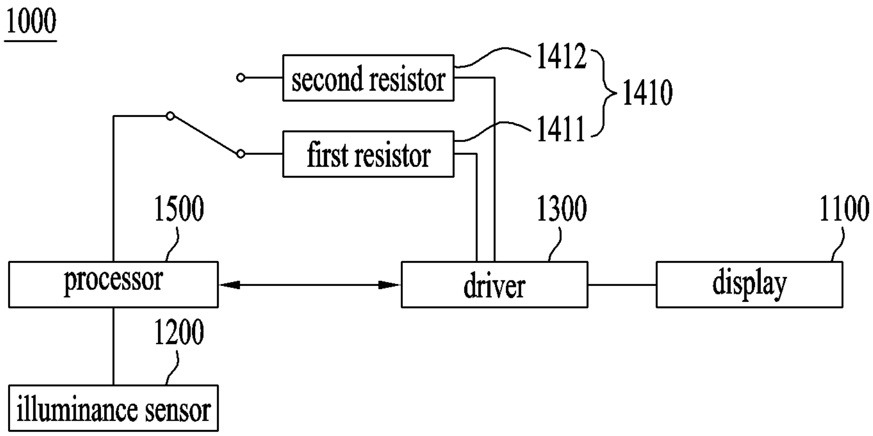
FIG. 4 is a block diagram illustrating an example of a method for driving a display device according to the embodiments of the present disclosure.

FIG. 4 is a block diagram illustrating an example of a method for driving the display device 1000 according to the embodiments of the present disclosure.

The display device 1000 according to the embodiments may include a display 1100 including a plurality of display modules 1110 (see FIG. 2), an illuminance sensor 1200 for measuring the amount of light for the display 1100, one or more drivers 1300 for driving the display 1100, a current output unit 1400 (see FIG. 3) connected to the one or more drivers 1300, and a processor 1500 for controlling all or part of the components included in the display device 1000.

The current output unit 1400 (see FIG. 3) according to the embodiments may serve as one type of current output unit, and may include a resistor 1410. The resistor 1410 may include a first resistor 1411 and a second resistor 1412 having two or more different resistance values. At this time, the second resistor may have a greater resistance value than the first resistor.

Although FIG. 4 illustrates only two resistors with different resistance values for convenience of explanation, the resistor 1410 may be implemented as N resistors (e.g., 1411, 1412) having different resistance values (where N is an integer of 2 or more).

The driver 1300 according to the embodiments may output a high current value when connected to the first resistor 1411. When connected to the first resistor 1411, the driver 1300 can enable the display 1100 to output up to a high luminance range. That is, the driver 1300 may be connected to the first resistor 1411 when the information about the illuminance (e.g., light quantity) measured by the illuminance sensor 1200 indicates, for example, a preset value or greater.

When connected to the second resistor 1412, the driver 1300 may output a smaller current value as compared to when connected to the first resistor 1411. When connected to the second resistor 1412, the driver 1300 may enable the display 1100 to output up to a low luminance range thereon. That is, the driver 1300 may be connected to the second resistor 1412 when information about illuminance (e.g., light quantity) measured by the illuminance sensor 1200 is, for example, less than a preset value.

The driver 1300 may be connected by the processor 1500 to an appropriate current output unit based on the value measured by the illuminance sensor 1200 as described above. For example, when the amount of light is greater than a preset value and the output of high luminance is required, the driver 1300 may be connected to the first resistor 1411 to increase a maximum output luminance value of the display. Additionally, for example, when the amount of light is less than or equal to a preset value and the output of low luminance is required, the driver 1300 may be connected to the second resistor 1412 to reduce a maximum output luminance value of the display.

Accordingly, the display 1100 may prevent grayscale loss when outputting low-luminance images or low-luminance videos in a state in which the display 1100 is set to a high luminance level. That is, the driver 1300 may be connected to an appropriate resistance (e.g., the first resistor 1411 and the second resistor 1412) based on the value measured by the illuminance sensor 1200 in a manner that the value of an output current is changed, so that luminance of the display 1100 can be determined or set without loss in gamma and grayscale expression.

Additionally, through such luminance control, the display device 1000 may determine or set luminance within a range that can obtain DCI-P3 certification without loss in gamma and grayscale expression.

At this time, information about illuminance (including the amount of light) measured by the illuminance sensor 1500 according to the embodiments may change quickly within a short time, for example, a time during which the sun is obscured by clouds and then reappears. In this case, the setting for the maximum luminance of the display 1100 may be changed unnecessarily.

Accordingly, the processor 1500 may control the driver 1300 to be connected to at least one of two or more current output units (e.g., 1411, 1412) based on an average value measured during a preset time with respect to information about illuminance measured by the illuminance sensor 1200. Thus, the processor 1500 may prevent a maximum luminance of the display 1100 from unnecessarily changing.

Figure 5:
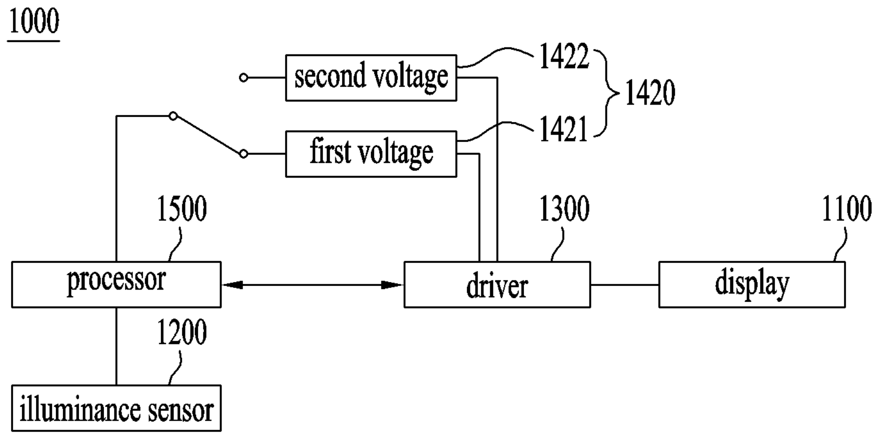
FIG. 5 is a block diagram illustrating another example of a method for driving a display device according to the embodiments of the present disclosure.

FIG. 5 is a block diagram illustrating another example of a method for driving the display device 1000 according to the embodiments of the present disclosure.

FIG. 5 is a block diagram showing another example of a method for driving the display device according to the embodiments of the present disclosure.

The display device 1000 according to the embodiments may include a display 1100 including a plurality of display modules 1110 (see FIG. 2), an illuminance sensor 1200 for measuring the amount of light for the display 1100, one or more drivers 1300 for driving the display 1100, a current output unit 1400 (see FIG. 3) connected to the one or more drivers 1300, and a processor 1500 for controlling all or part of the components included in the display device 1000.

The current output unit 1400 (see FIG. 3) according to the embodiments may serve as one type of current output unit, and may include a voltage 1420. The voltage 1420 may include a first voltage 1421 and a second voltage 1422 having two or more different voltage values. At this time, the second voltage may have a smaller voltage value than the first voltage.

Although FIG. 5 illustrates only two voltages with different voltage values for convenience of explanation, the voltage 1420 may be implemented as N voltages (e.g., 1421, 1422) having different voltage values (where N is an integer of 2 or more).

The driver 1300 according to the embodiments may output a high current value when connected to the first voltage 1421. When connected to the first voltage 1421, the driver 1300 can enable the display 1100 to output up to a high luminance range. That is, the driver 1300 may be connected to the first voltage 1421 when the information about the illuminance (e.g., light quantity) measured by the illuminance sensor 1200 indicates, for example, a preset value or greater.

When connected to the second voltage 1422, the driver 1300 may output a smaller current value as compared to when connected to the first voltage 1421. When connected to the second voltage 1422, the driver 1300 may enable the display 1100 to output up to a low luminance range thereon. That is, the driver 1300 may be connected to the second voltage 1422 when information about illuminance (e.g., light quantity) measured by the illuminance sensor 1200 is, for example, less than a preset value.

The driver 1300 may be connected by the processor 1500 to an appropriate current output unit 1400 (see FIG. 3) based on the value measured by the illuminance sensor 1200 as described above. For example, when the amount of light is greater than a preset value and the output of high luminance is required, the driver 1300 may be connected to the first voltage 1421 to increase a maximum output luminance value of the display. Additionally, for example, when the amount of light is less than or equal to a preset value and the output of low luminance is required, the driver 1300 may be connected to the second voltage 1422 to reduce a maximum output luminance value of the display.

Accordingly, the display 1100 may prevent grayscale loss when outputting low-luminance images or low-luminance videos in a state in which the display 1100 is set to a high luminance level. That is, the driver 1300 may be connected to an appropriate voltage (e.g., the first voltage 1421 and the second voltage 1422) based on the value measured by the illuminance sensor 1200 in a manner that the value of an output current is changed, so that luminance of the display 1100 can be determined or set without loss in gamma and grayscale expression.

Additionally, through such luminance control, the display device 1000 may determine or set luminance within a range that can obtain DCI-P3 certification without loss in gamma and grayscale expression.

At this time, information about illuminance (including the amount of light) measured by the illuminance sensor 1500 according to the embodiments may change quickly within a short time, for example, a time during which the sun is obscured by clouds and then reappears. In this case, the setting for the maximum luminance of the display 1100 may be changed unnecessarily.

Accordingly, the processor 1500 may control the driver 1300 to be connected to at least one of two or more current output units (e.g., 1411, 1412) based on an average value measured during a preset time with respect to information about illuminance measured by the illuminance sensor 1200. Thus, the processor 1500 may prevent a maximum luminance of the display 1100 from unnecessarily changing.

Figure 6:
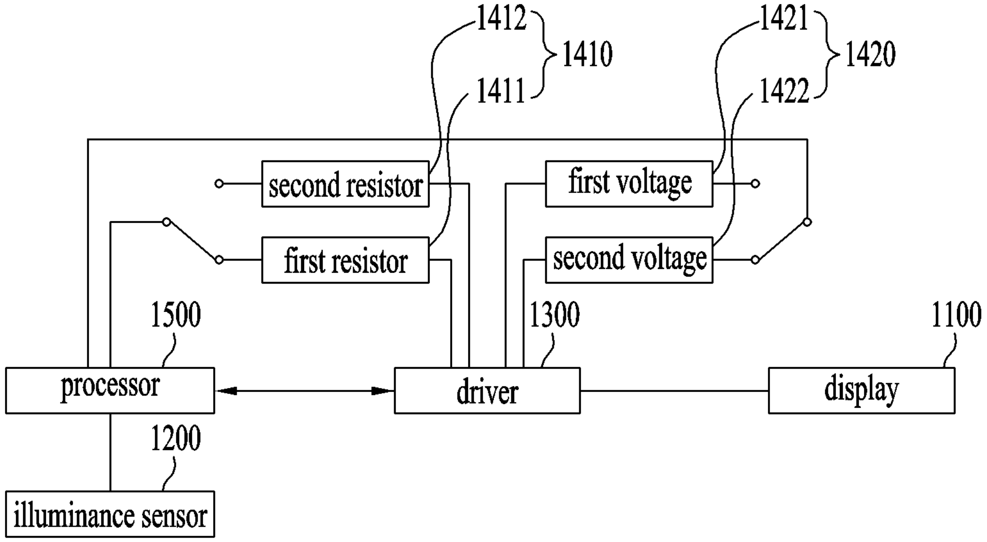
FIG. 6 is a block diagram illustrating another example of a method for driving a display device to which both of FIGS. 4 and 5 are applied.

FIG. 6 is a block diagram illustrating another example of a method for driving the display device 1000 according to the embodiments of the present disclosure.

FIG. 6 is a block diagram illustrating another example of a method for driving the display device 1000 to which both of FIGS. 4 and 5 are applied.

The display device 1000 according to the embodiments may include a display 1100 including a plurality of display modules 1110 (see FIG. 2), an illuminance sensor 1200 for measuring the amount of light for the display 1100, one or more drivers 1300 for driving the display 1100, a current output unit 1400 connected to the one or more drivers 1300, and a processor 1500 for controlling all or part of the components included in the display device 1000.

The current output unit 1400 according to the embodiments may serve as two types of current output units, and may include a resistance 1410 and a voltage 1420. Although FIG. 6 illustrates only two resistors with different resistance values for convenience of explanation, the resistor 1410 may be implemented as N resistors (e.g., 1411, 1412) having different resistance values (where N is an integer of 2 or more).

The resistor 1410 may include a first resistor 1411 and a second resistor 1412 having two or more different resistance values. At this time, the second resistor may have a greater resistance value than the first resistor.

The voltage 1420 may include a first voltage 1421 and a second voltage 1422 having two or more different voltage values. At this time, the second voltage may have a smaller voltage value than the first voltage. Although FIG. 6 illustrates only two voltages with different voltage values for convenience of explanation, the voltage 1420 may be implemented as N voltages (e.g., 1421, 1422) having different voltage values (where N is an integer of 2 or more).

When connected to the first resistor 1411, the driver 1300 may output a high current value. When connected to the first resistor 1411, the driver 1300 may enable the display 1100 to output up to a high luminance range thereon. That is, the driver 1300 may be connected to the first resistor 1411 when information about illuminance (e.g., light quantity) measured by the illuminance sensor 1200 is, for example, equal to or higher than a preset value.

Even when the driver 1300 is connected to the first resistor 1411, a luminance value to be output through the display 1100 may not reach a desired luminance value. In this case, the display 1100 may not output an appropriate luminance value. At this time, the driver 1300 may be connected to the first resistor 1411 and also connected to the first voltage 1421. As the driver 1300 is simultaneously connected to the first resistor 1411 and the first voltage 1421, the driver 1300 may output a higher current value than when connected only to the first resistor 1411. As a result, a luminance value of the driver 1300 can reach the luminance value desired to be output through the display 1100.

Alternatively, when the driver 1300 is connected to the first resistor 1411, a luminance value to be output through the display 1100 may not reach a desired luminance value. In this case, the display 1100 may not output an appropriate luminance value. At this time, the driver 1300 may be connected to the first resistor 1411 and also connected to the second voltage 1422. As the driver 1300 may be simultaneously connected to the first resistor 1411 and the second voltage 1422, the driver 1300 may output a higher current value than when connected only to the first resistor 1411, and may output a smaller current value than when connected to both the first resistor 1411 and the first voltage 1421.

When connected to the second resistor 1412, the driver 1300 may output a smaller current value as compared to when connected to the first resistor 1411. When connected to the second resistor 1412, the driver 1300 may enable the display 1100 to output up to a low luminance range thereon. That is, the driver 1300 may be connected to the second resistor 1412 when information about illuminance (e.g., light quantity) measured by the illuminance sensor 1200 is, for example, less than a preset value.

Even when the driver 1300 is connected to the second resistor 1412, a luminance value to be output through the display 1100 may not reach a desired luminance value. In this case, the display 1100 may not output an appropriate luminance value. At this time, the driver 1300 may be connected to the second resistor 1412 and also connected to the first voltage 1421. As the driver 1300 is simultaneously connected to the second resistor 1412 and the first voltage 1421, the driver 1300 may output a higher current value than when connected only to the second resistor 1412. As a result, a luminance value of the driver 1300 can reach the luminance value desired to be output through the display 1100.

Alternatively, when the driver 1300 is connected to the second resistor 1412, a luminance value to be output through the display 1100 may not reach a desired luminance value. In this case, the display 1100 may not output an appropriate luminance value. At this time, the driver 1300 may be connected to the second resistor 1412 and also connected to the second voltage 1422. As the driver 1300 may be simultaneously connected to the second resistor 1412 and the second voltage 1422, the driver 1300 may output a higher current value than when connected only to the second resistor 1412, and may output a smaller current value than when connected to both the second resistor 1412 and the first voltage 1421.

That is, the processor 1500 may control the driver 1300 to be connected to the appropriate current output unit 1400 based on the value measured by the illuminance sensor 1200. The processor 1500 may select an appropriate combination of the current output units 1400 based on the value measured by the illuminance sensor 1200, and may control the selected combination to be connected to the driver 1300.

At this time, although the processor 1500 controls the driver 1300 to be connected to the resistor 1410 first and then controls the driver 1300 to be connected to a portion of the voltage 1420 for appropriate luminance output, the scope or spirit of the processor 1500 is not limited thereto. For example, the processor 1500 controls the driver 1300 to be connected to the voltage 1420 first, and then controls the driver 1300 to be connected to a portion of the resistor 1410 for appropriate luminance output.

Additionally, through such luminance control, the display device 1000 may determine or set luminance within a range that can obtain DCI-P3 certification without loss in gamma and grayscale expression.

At this time, information about illuminance (including the amount of light) measured by the illuminance sensor 1500 according to the embodiments may change quickly within a short time, for example, a time during which the sun is obscured by clouds and then reappears. In this case, the setting for the maximum luminance of the display 1100 may be changed unnecessarily.

Accordingly, the processor 1500 may control the driver 1300 to be connected to at least one of two or more current output units (e.g., 1411, 1412) based on an average value measured during a preset time with respect to information about illuminance measured by the illuminance sensor 1200. Thus, the processor 1500 may prevent a maximum luminance of the display 1100 from unnecessarily changing.

Accordingly, the display 1100 may be set to have appropriate luminance based on information about each illuminance applied to all or part of the display device 1000. Accordingly, the display 1100 may determine or set a luminance value without loss in gamma and grayscale expression according to the surrounding illumination, and may output the optimal image quality.

FIG. 7 is a diagram schematically illustrating a front view of the display device 1000 according to the embodiments of the present disclosure.

Referring to FIG. 7, 1000 denotes a display device, 1100 denotes a display, 1110 denotes a display module, and 1111 denotes a light emitting device package.

FIG. 7 illustrates that high illuminance is applied to some parts of the display 1100 and at the same time low illuminance is applied to some other parts of the display 1100. For example, FIG. 7 shows a state in which sunlight shines strongly on some parts of the display 1100 and sunlight is obscured by clouds on some other parts of the display 1100. Alternatively, FIG. 7 illustrates a case where the display 1100 has strong illumination and another case where the display 1100 has weak illumination, and these two cases are spatially the same but at different times.

In FIG. 7, 1100A denotes a portion with strong illuminance of the display 1100 and represents a portion with high surrounding luminance, and 1100B denotes a portion with weak illuminance of the display 1100 and represents a portion with no surrounding luminance.

The display device 1000 according to the embodiments may include a display 1100. The display 1100 may include a plurality of display modules 1110. Each of the plurality of display modules may include a light emitting device package 1111.

The display 1100 according to the embodiments may include a first group 1100A including at least a portion of the plurality of display modules and a second group 1100B including at least another portion of the plurality of display modules.

At this time, it can be seen that the amount of light incident upon the first group 1100A is large, and the amount of light incident upon the second group 1100B is small. Therefore, in order to prevent loss of gamma and grayscale expression, it is necessary to set the first group 1100A with a high luminance value and the second group 1100B with a low luminance value.

To this end, when the processor 1500 (see FIG. 3) determines that the amount of light incident upon the first group 1100A and the amount of light incident upon the second group 1100B are different from each other, the processor 1500 may control the driver 1300 (see FIG. 3) connected to both the first group 1100A and the second group 1100B to be connected to different current output units from among two or more current output units 1400 (see FIG. 3). In this case, the illuminance sensor 1200 may be connected to each of the first group 1100A and the second group 1100B.

That is, the processor 1500 (see FIG. 3) may differently measure the illuminance for each of the plurality of display groups (e.g., the first group and the second group), and may control the driver 1300 to output different currents. In addition, the processor 1500 (see FIG. 3) may allow the plurality of display groups (e.g., the first group and the second group) to have different maximum luminance values, so that different maximum luminance values are assigned to the display groups.

Meanwhile, the plurality of display modules 1110 according to the embodiments may include a first display module 1110A and a second display module 1110B.

At this time, it can be seen that the amount of light incident upon the first display module 1110A is large, and the amount of light incident upon the second display module 1110B is small. Therefore, in order to prevent loss of gamma and grayscale expression, it is necessary to set the first display module 1110A with a high luminance value and the second display module 1110B with a low luminance value.

To this end, when the processor 1500 (see FIG. 3) determines that the amount of light incident upon the first display module 1110A and the amount of light incident upon the second display module 1110B are different from each other, the processor 1500 may control the driver 1300 (see FIG. 3) connected to both the first display module 1110A and the second display module 1110B to be connected to different current output units from among two or more current output units 1400 (see FIG. 3). In this case, the illuminance sensor 1200 may be connected to each of the first display module 1110A and the second display module 1110B.

That is, the processor 1500 (see FIG. 3) may differently measure the illuminance for each of the plurality of display modules (e.g., the first display module and the second display module), and may control the driver 1300 to output different currents. In addition, the processor 1500 (see FIG. 3) may allow the plurality of display modules (e.g., the first display module and the second display module) to have different maximum luminance values, so that different maximum luminance values are assigned to the display modules.

Meanwhile, the plurality of light emitting device packages 1111 according to the embodiments may include a first light emitting device package 1111A and a second light emitting device package 1111B.

At this time, it can be seen that the amount of light incident upon the first light emitting device package 1111A is large, and the amount of light incident upon the second light emitting device package 1111B is small. Therefore, in order to prevent loss of gamma and grayscale expression, it is necessary to set the first light emitting device package 1111A with a high luminance value and the second light emitting device package 1111B with a low luminance value.

To this end, when the processor 1500 (see FIG. 3) determines that the amount of light incident upon the first light emitting device package 1111A and the amount of light incident upon the second light emitting device package 1111B are different from each other, the processor 1500 may control the driver 1300 (see FIG. 3) connected to both the first light emitting device package 1111A and the second light emitting device package 1111B to be connected to different current output units from among two or more current output units 1400 (see FIG. 3). In this case, the illuminance sensor 1200 may be connected to each of the first light emitting device package 1111A and the second light emitting device package 1111B.

That is, the processor 1500 (see FIG. 3) may differently measure the illuminance for each of the plurality of display modules (e.g., the first light emitting device package and the second light emitting device package), and may control the driver 1300 to output different currents. In addition, the processor 1500 (see FIG. 3) may allow the plurality of display modules (e.g., the first display module and the second display module) to have different maximum luminance values, so that different maximum luminance values are assigned to the display modules.

The processor 1500 (see FIG. 3) may control the driver 1300 (see FIG. 3) to be connected to an appropriate current output unit 1400 (see FIG. 3) so that a maximum luminance value can be set differently for each preset range based on a measurement value obtained by the illuminance sensor 1200 (see FIG. 3) for a preset range (e.g., each of the displays, each of the display modules, and each of the light emitting device packages). Accordingly, the display may output the optimal image quality without loss of grayscale expression.

Hereinafter, various embodiments in which luminance of the display device 1000 according to the embodiments are controlled will be described in detail.

Figure 8:
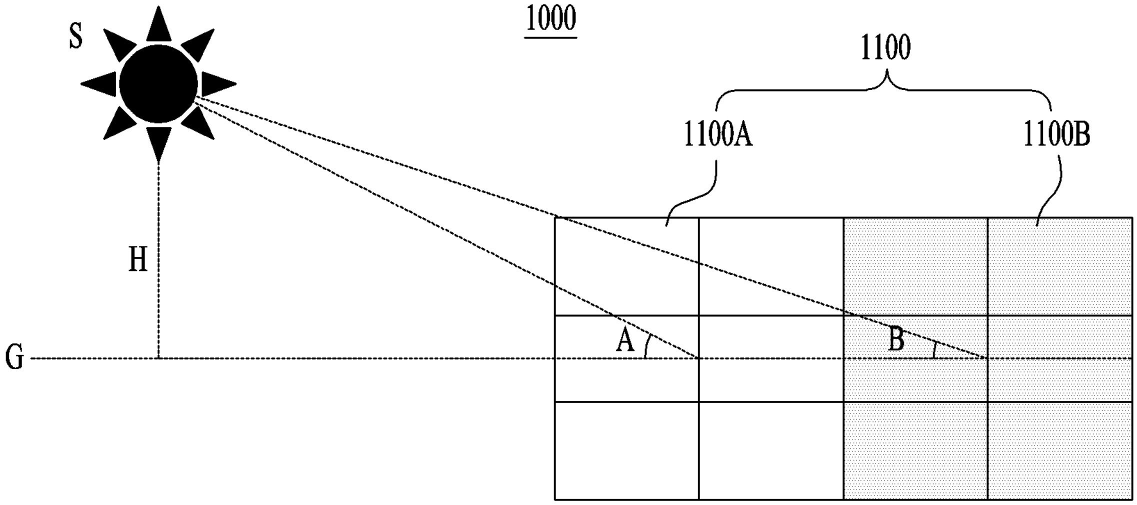
FIG. 8 illustrates a positional relationship between the display device and the sun according to the embodiments of the present disclosure.

FIG. 8 illustrates a positional relationship between the display device and the sun according to the embodiments of the present disclosure.

Referring to FIG. 8, 1000 denotes a display device, and 1100 denotes a display.

In FIG. 8, 1100A denotes a portion with strong illuminance of the display 1100 and represents a portion with high surrounding luminance, and 1100B denotes a portion with weak illuminance of the display 1100 and represents a portion with no surrounding luminance.

Additionally, 'S' represents the sun (light source), 'G' represents a baseline from which the incident angle of the sun is measured, 'H' represents a vertical distance from the sun to the baseline (G), 'A' represents an angle of incidence between 1100A and the sun (S), and 'B' represents an angle of incidence between 1100B and the sun (S).

The display 1100 according to the embodiments may include a first group 1100A including at least a portion of the plurality of display modules and a second group 1100B including at least another portion of the plurality of display modules.

At this time, since the display 1100 has a preset size or more, not only the amount of light incident upon the first group 1100A and the second group 1100B, but also the angle of incidence or the position of the sun at the time of light incidence may be different.

Accordingly, the processor 1500 (see FIG. 3) according to the embodiments may control the driver 1300 (see FIG. 3) to be connected to at least one of two or more current output units 1400 (see FIG. 3) based on data measured by the illuminance sensor 1200 (see FIG. 3), for example, based on the position and angle of the sun for each hour with respect to each of the first group 1100A and the second group 1100B.

Alternatively, the processor 1500 (see FIG. 3) may calculate the hourly position and angle of the sun for each of the first group 1100A and the second group 1100B based on data previously stored in the memory 1600. The processor 1500 (see FIG. 3) may control the driver 1300 (see FIG. 3) to be connected to at least one of two or more current output units 1400 (see FIG. 3) based on the calculated value.

At this time, the pre-stored data may include information about the installation environment in which the display device 1000 is installed, for example, information about the latitude and longitude of a place where the display device 1000 is installed, information about a date, and information about an altitude of the sun by date.

The processor 1500 (see FIG. 3) may use values for the position and angle of the sun stored in the memory 1600 (see FIG. 3) based on information about the installation environment. Alternatively, the processor 1500 may calculate a value for the position and angle of the sun using the information about the installation environment and the information such as H, A, and B parameters.

In FIG. 8, it can be seen that the angle of incidence (A) for the first group 1100A is greater than the angle of incidence (B) for the second group 1100B. Accordingly, it can be seen that the amount of light for the first group 1100A is relatively large, and the amount of light for the second group 1100B is relatively small.

Accordingly, the processor 1500 (see FIG. 3) may calculate such information or obtain such information from the illuminance sensor 1200 (see FIG. 3). Therefore, the processor 1500 may control the driver 1300 (see FIG. 3) driving the first group 1100A to be connected to the current output unit 1400 (see FIG. 3) that outputs a relatively large current, and may control the driver 1300 (see FIG. 3) driving the second group 1100B to be connected to the current output unit 1400 (see FIG. 3) that outputs a relatively large current.

Although FIG. 8 shows the first group 1100A and the second group 1100B for convenience of explanation, the scope or spirit of the first and second groups 1100A and 1100B is not limited thereto, and it should be noted that the first group 1100A and the second group 1100B can also be applied to the first display module 1110A and the second display module 1110B. Furthermore, the embodiment described in FIG. 8 is also applicable to the first light emitting device package 1111A and the second light emitting device package 1111B. Additionally, the embodiment described in FIG. 8 can also be equally applied to the entire display 1100 even if the passage of time changes.

Figure 9:
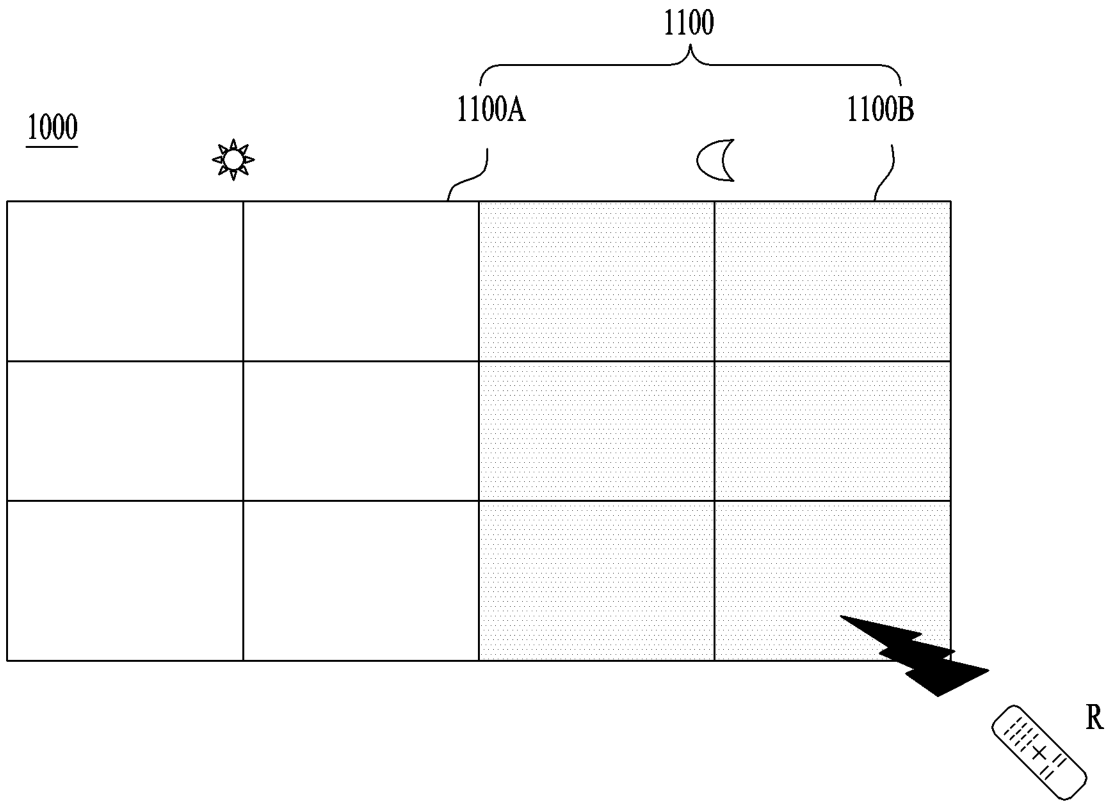
FIG. 9 is a conceptual diagram illustrating a method of manually controlling a display device according to the embodiments of the present disclosure.

FIG. 9 is a conceptual diagram illustrating a method of manually controlling the display device according to the embodiments of the present disclosure.

Referring to FIG. 9, 1000 denotes a display device, 1100 denotes a display, and R denotes an external device (e.g., a remote controller) capable of performing wireless or wired communication with the display device 1000.

In addition, 1100A is a portion with strong illuminance of the display 1100 and represents a portion with high surrounding luminance, and 1100B is a portion with low illuminance of the display 1100 and represents a portion with no surrounding luminance.

The display 1100 according to the embodiments may include a first group 1100A including at least a portion of the plurality of display modules and a second group 1100B including at least another portion of the plurality of display modules. Hereinafter, embodiments of the display 1100 will be described in detail.

As described in FIG. 3, the display device 1000 according to the embodiments may further include a communication unit 1700 capable of transmitting and receiving data to and from the outside.

The processor 1500 (see FIG. 3) according to the embodiments may control the driver 1300 (see FIG. 3) to be connected to at least one of two or more current output units 1400 (see FIG. 3) based on data received through the communication unit 1700 (see FIG. 3).

For example, when a control command for setting the maximum luminance value for the first group 1100A to 6000 nits is received from the remote controller (R), the processor 1500 (see FIG. 3) may set the maximum luminance value of the first group 1100A to 6000 nits. That is, the processor 1500 (see FIG. 3) may control the driver 1300 (see FIG. 3) for the first group to be connected to the current output unit 1400 (see FIG. 3) that outputs a relatively high current value. In addition, for example, when a control command for setting the maximum luminance value for the second group 1100B to 48 nits is received from the remote controller (R), the processor 1500 (see FIG. 3) may set the maximum luminance value of the second group to 48 nits. That is, the processor 1500 (see FIG. 3) may control the driver 1300 (see FIG. 3) for the second group to be connected to the current output unit 1400 (see FIG. 3) that outputs a relatively low current value.

At this time, a command received through the communication unit 1700 (see FIG. 3) may include only a command for simply increasing or decreasing luminance.

As a result, the user can set the luminance value as desired, regardless of the luminance value set through the current illuminance, and the display device 1000 can satisfy personal needs for the output image.

Meanwhile, as described in FIG. 3, the display device 1000 according to the embodiments may further include a touch sensor 1800.

Although not shown in FIG. 9, one or more user interfaces (UIs) may be displayed on the display 1100 according to the embodiments. At this time, the UI may include information for controlling the driver to be connected to at least one of two or more current output units.

When the processor 1500 (see FIG. 3) according to the embodiments detects an input to the UI through the touch sensor 1800 (see FIG. 3), the processor 1500 may control the driver 1300 (see FIG. 3) to be connected to two or more current output units 1400 (see FIG. 3) based on the detected input.

For example, when a control command for setting the maximum luminance value for the first group 1100A to 6000 nits is received from the first group 1100A, the processor 1500 (see FIG. 3) may set the maximum luminance value of the first group 1100A to 6000 nits. That is, the processor 1500 (see FIG. 3) may control the driver 1300 (see FIG. 3) for the first group to be connected to the current output unit 1400 (see FIG. 3) that outputs a relatively high current value. In addition, for example, when a control command for setting the maximum luminance value for the second group 1100B to 48 nits is received from the user interface (UI), the processor 1500 (see FIG. 3) may set the maximum luminance value of the second group to 48 nits. That is, the processor 1500 (see FIG. 3) may control the driver 1300 (see FIG. 3) for the second group to be connected to the current output unit 1400 (see FIG. 3) that outputs a relatively low current value.

At this time, a command received through the touch sensor 1800 (see FIG. 3) may include only a command for simply increasing or decreasing luminance.

At this time, commands can be input to the display device 1000 not only through the touch sensor 1800, but also through a voice sensor (not shown), a motion sensor (not shown), etc. In this case, commands are input to the display device 1000 through voice and motion, respectively.

As a result, the user can set the luminance value as desired, regardless of the luminance value set through the current illuminance, and the display device 1000 can satisfy personal needs for the output image.

Meanwhile, as described in FIG. 3, the display device 1000 according to the embodiments may include two or more current output units 1400 (see FIG. 3). The current output unit 1400 (see FIG. 3) may include a first current output unit and a second current output unit.

In addition, although not shown in FIG. 9, the processor 1500 (see FIG. 3) according to the embodiments may control the driver 1300 (see FIG. 3) to be alternately connected to the first current output unit and the second current output unit at intervals of a preset time.

For example, the processor 1500 (see FIG. 3) may set the preset time to 12 hours, may control the driver 1300 (see FIG. 3) to be connected to a first current output unit having a relatively high current value being output during the daytime, and may control the driver 1300 to be connected to a second current output unit having a relatively low current value being output during the nighttime.

As a result, the display device 1000 can control the display 1100 to have an appropriate luminance value without any special calculation or measurement.

Although FIG. 9 shows the first group 1100A and the second group 1100B for convenience of explanation, the scope or spirit of the first and second groups 1100A and 1100B is not limited thereto, and it should be noted that the first group 1100A and the second group 1100B can also be applied to the first display module 1110A and the second display module 1110B. Furthermore, the embodiment described in FIG. 9 is also applicable to the first light emitting device package 1111A and the second light emitting device package 1111B. Additionally, the embodiment described in FIG. 9 can also be equally applied to the entire display 1100 even if the passage of time changes.

In the present document, "/" and "," can be interpreted as "and/or." For example, the expression "A/B" may mean "A and/or B." Furthermore, "A, B" may mean "A and/or B." Furthermore, "A/B/C" may mean "at least one of A, B and/or C."

Further, in the patent document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Components of the display device according to the embodiments described in FIGS. 1 to 9 may be configured as separate hardware (e.g., chips, hardware circuits, communicable devices, etc.) or may be implemented as a single piece of hardware. Additionally, at least one of the display devices according to the embodiments may be configured with one or more processors capable of executing programs.

In addition, although this patent document has been described with reference to the attached drawings, it is also possible to design a new embodiment by merging the embodiments shown in the attached drawings with each other. In addition, if a recording medium readable by a computer in which a program for executing the above-described embodiments is recorded is designed according to the needs of a person skilled in the art, the resultant recording medium may fall within the scope of rights and equivalents claimed in this specification.

That is, the present specification has been described with reference to the accompanying drawings, but the present specification is not limited to a specific embodiment, and various contents capable of being modified by a person skilled in the art to which the present disclosure pertains belongs to the scope of the right according to the claims. Further, such modifications are not to be individually understood from the technical idea of the present disclosure.

Instructions executable for driving or controlling the display device may be stored either in a non-transitory CRM implemented to be executed by one or more processors, or in other computer program products, or may be stored either in a transitory CRM implemented to be executed by one or more processors or in other computer program products. In addition, the memory according to the embodiments of the present disclosure may conceptually include not only a volatile memory (e.g., RAM, etc.), but also a non-volatile memory, a flash memory, PROM, etc.

The invention claimed is:

1. A display device comprising:
- a display including a plurality of display modules;
- one or more drivers configured to drive the display;
- two or more current output units configured to be selectively connected to the one or more drivers, and configured to output different currents;
- a memory configured to store data; and
- a processor configured to;
  - calculate an hourly position and angle of the sun with respect to the display based on data stored in the memory; and
  - control at least one driver of the one or more drivers to selectively connect to at least one of the two or more current output units based on the calculated hourly position and angle of the sun.

2. The display device according to claim 1, further comprising a sensor configured to measure an amount of light incident on at least a portion of the display:
- wherein the two or more current output units include a first resistor having a first resistance value and a second resistor having a second resistance value greater than the first resistance value, and
- wherein the processor is configured to:
  - control the at least one driver to selectively connect to the first resistor when the amount of light measured by the sensor is equal to or greater than a preset value, and
  - control the at least one driver to selectively connect to the second resistor when the amount of light measured by the sensor is less than the preset value.

3. The display device according to claim 2, wherein:
- the two or more current output units include two or more voltages having different magnitudes, and
- wherein the processor is configured to:

control the at least one driver to selectively connect to at least one of the two or more voltages based on the amount of light measured by the sensor.

4. The display device according to claim 3, wherein:

the two or more voltages include a first voltage and a second voltage having a magnitude smaller than the first voltage, and wherein the processor is configured to:

control the at least one driver to selectively connect to the first voltage when the amount of light measured by the sensor is equal to or greater than the preset value; and control the at least one driver to selectively connect to the second voltage when the amount of light measured by the sensor is less than the preset value.

5. The display device according to claim 1, wherein the display includes:

a first group including at least a portion of the plurality of display modules; and a second group including at least another portion of the plurality of display modules, and wherein the processor is configured to:

control the driver connected to each of the first group and the second group to be connected to different current output units from among the two or more current output units, when an amount of light incident on the first group is different from an amount of light incident on the second group.

6. The display device according to claim 1, wherein:

the plurality of display modules includes a first display module and a second display module, and wherein the processor is configured to:

control the driver connected to each of the first display module and the second display module to be connected to different current output units from among the two or more current output units, when an amount of light incident on the first display module is different from an amount of light incident on the second display module.

7. The display device according to claim 1, wherein:

each of the plurality of display modules includes a plurality of light emitting device packages including a first light emitting device package and a second light emitting device package, and wherein the processor is configured to:

control the driver connected to each of the first light emitting device package and the second light emitting device package to be connected to different current output units from among the two or more current output units, when an amount of light incident on the first light emitting device package is different from an amount of light for incident on the second light emitting device package.

8. The display device according to claim 1, further comprising a sensor configured to measure an amount of light incident on at least a portion of the display, wherein the processor is configured to:

control the at least one driver to selectively connect to at least one of the two or more current output units based on an average value of the amount of light measured by the sensor for a preset time.

9. The display device according to claim 1, wherein:

one or more user interfaces (UIs) configured to control the driver to be connected to at least one of the two or more current output units are displayed on the display; and when an input to a user interface (UI) of the one or more UIs is detected, the processor is configured to control the driver to selectively connect to at least one of the two or more current output units based on the detected input.

10. The display device according to claim 1, further comprising:

a communication unit configured to transmit and receive data to and from outside the display device, wherein the processor is configured to:

control the at least one driver to selectively connect to at least one of the two or more current output units based on data input through the communication unit.

11. The display device according to claim 1, wherein the two or more current output units include:

a first current output unit and a second current output unit having an output current different from that of the first current output unit, and wherein the processor is configured to:

control at least one driver of the one or more drivers to be alternately connected to the first current output unit and the second current output unit at intervals of a preset time.

12. The display device according to claim 1, wherein data stored in the memory includes at least one of information about an installation environment of the display device, information about a date, or information about a relative position of the sun.

13. The display device according to claim 12, wherein the information about the installation environment includes information about latitude and longitude of a place where the display device is installed, or wherein the information about the relative position of the sun includes an altitude of the sun by date.

14. The display device according to claim 1, wherein the display includes:

a first group including at least a portion of the plurality of display modules; and a second group including at least another portion of the plurality of display modules, wherein the processor is configured to:

periodically calculate an hourly position and angle of the sun with respect to the first group and the second group; and control the driver connected to each of the first group and the second group to be connected to different current output units from among the two or more current output units based on the calculated hourly position and angle of the sun.

15. The display device according to claim 1, wherein the processor is configured to periodically calculate a relative position and angle of the sun with respect to the display device.

16. The display device according to claim 15, wherein the memory is configured to store calculated positions and angles of the sun for each respective time period as the stored data.

17. The display device according to claim 16, wherein the processor is configured to control the one or more drivers to selectively connect to at least one of the two or more current output units based on the stored data.

* * * * *